F. M. BOESCH AND E. G. FOSTER.
FISH SCALING DEVICE.
APPLICATION FILED OCT. 3, 1918.
1,324,581.
Patented Dec. 9, 1919.
2 SHEETS—SHEET 2.
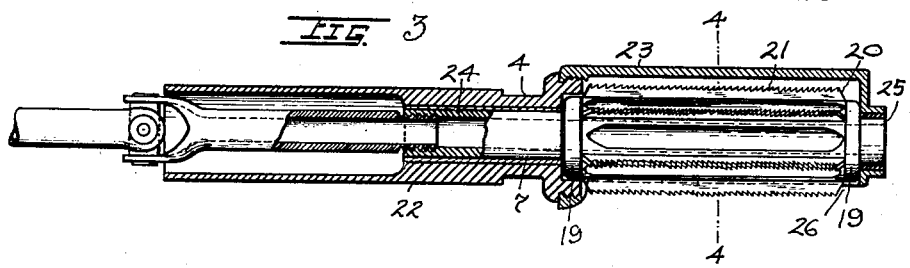
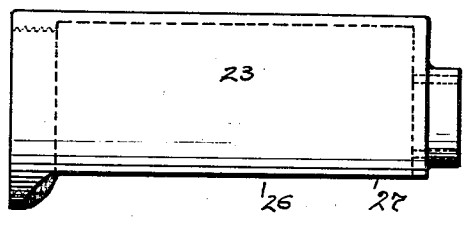 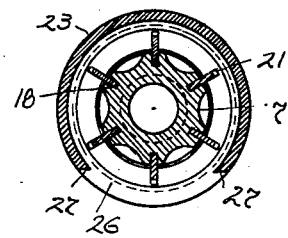
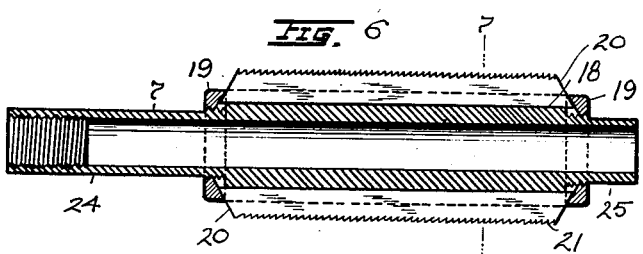 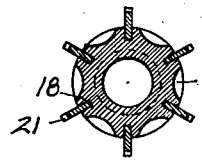
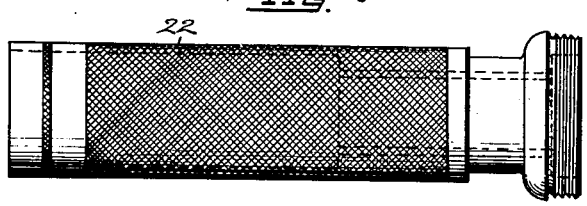 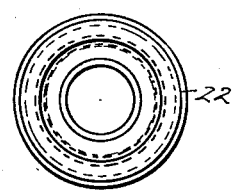
Inventors
Fred M. Boesch
Edgar G. Foster
Witness
Geo. E. Kriener
By Fisher & Stewart
Attorneys

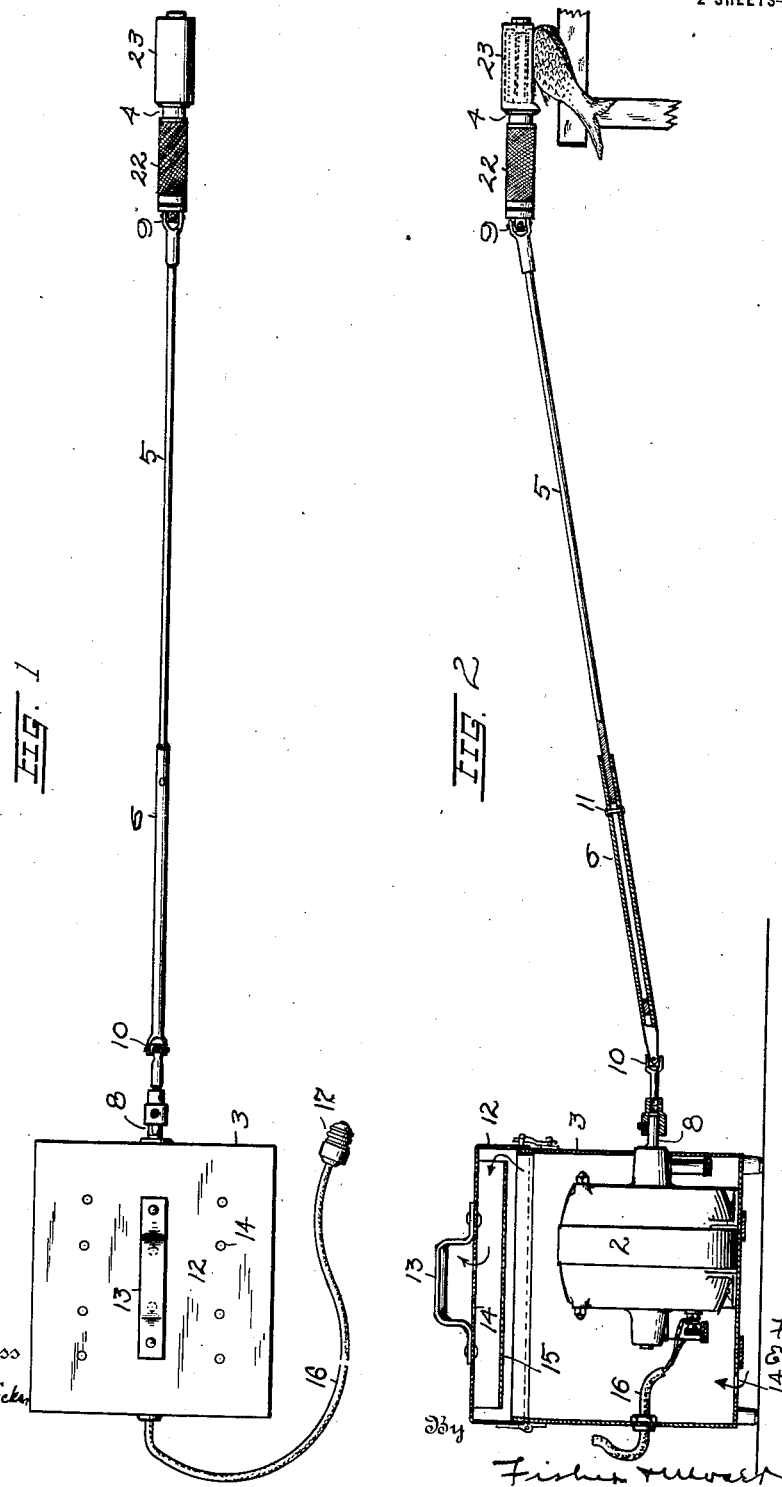

UNITED STATES PATENT OFFICE.

FRED M. BOESCH AND EDGAR G. FOSTER, OF CLEVELAND, OHIO, ASSIGNORS TO THE BRANDT COMPANY, OF CLEVELAND, OHIO, A CORPORATION OF OHIO.

FISH-SCALING DEVICE.

1,324,581.   Specification of Letters Patent.   Patented Dec. 9, 1919.

Application filed October 3, 1918. Serial No. 256,706.

*To all whom it may concern:*

Be it known that I, FRED M. BOESCH and EDGAR G. FOSTER, citizens of the United States, residing at Cleveland, in the county of Cuyahoga and State of Ohio, have invented certain new and useful Improvements in Fish-Scaling Devices, of which the following is a specification.

This invention relates to a fish scaling apparatus, and the invention comprises the combination and arrangement of parts substantially as hereinafter shown and described and more particularly pointed out in the claim.

In fish markets, where large numbers of fish are handled and cleaned, the work of scaling the fish may be greatly expedited by the use of a power driven machine, and the object of the present invention is to provide a portable electrical scaling apparatus which is particularly constructed to facilitate scaling operations to promote cleanliness, simplify repairs and replacements, and afford proper safeguards for the operator and also the motor and its operating parts.

In the accompanying drawings, Figure 1 is a plan view of our improved portable scaling device, and Fig. 2 is a sectional view longitudinally of the scaling tool, Fig. 3 is a longitudinal sectional elevation of the tool enlarged as compared with Figs. 1 and 2, and Fig. 4 is a cross section of the tool on line 4—4, Fig. 3. Fig. 5 is a side view of the cylindrical guard for the rotary scaling member, and Fig. 6 is a sectional view longitudinally of said head, while Fig. 7 is a cross section on line 7—7, Fig. 6. Fig. 8 is a side view, and Fig. 9 an end view, of the tool handle.

The invention comprises an electric motor 2 confined within a metal box 3 and operatively connected with a hand scaling tool 4 by means of an extensible shaft made of two telescopic parts 5 and 6 which are united to the rotary member 7 of the tool and to the armature shaft 8 of the motor by universal joints or couplings 9 and 10, respectively. Shaft part 5 has a slotted end sleeved within the tubular part 6, and a pin 11 unites these parts for common rotation while affording a limited longitudinal extensible movement between the parts, and this movement taken with the universal movement at the couplings 9 and 10 gives the operator full and free control of the tool while the motor runs at high speed. The motor box 3 is equipped with a hinged cover 12 having a handle 13 adapting the apparatus to be carried from place to place, and this box and its cover also shields the motor from water and the fish scales which are ever present in the places where such an apparatus is used. To avoid overheating of the motor, the cover and bottom of the box are provided with air-openings 14, and the opening in the bottom of the box serves also as a drain outlet for any water which may find its way into the box through the openings in the cover. A guard plate 15 is also placed upon the inside of the cover to prevent water from dripping upon the motor and its electrical terminal connections for cable 16 which extends through one wall of the box and is equipped with an electrical attachment plug 17 at its end wherewith to make a socket coupling.

The scaling tool comprises a rotary member 7 having a cylindrical enlargement between its ends provided with slots 18 longitudinally thereof at equi-distant radial points therein, and the round body of said member is also screw-threaded opposite the ends of these slots to receive a pair of round nuts 19 having beveled faces adapted to engage the beveled ends 20 of a series of serrated scaling blades 21 placed in said slots. This arrangement of parts permits removal and replacement of worn blades, but inasmuch as the rotary member is confined within a tubular handle 22 and a cylindrical hood and guard 23, all such parts are screw-engaged and separable to give access to the blades and nuts. Thus, the inner spindle portion 24 of member 7 has rotatable bearing in handle 22, whereas a short shaft extension 25 at the outer end of this member has rotatable bearing in the outer end of the hood 23 adjacent the outer nut 19. Upon unscrewing the hood from the handle the hood may be slipped off and the nut reached and unscrewed to unlock and remove the blades, but when these parts are assembled the rotating blades are completely housed and guarded except at the bottom side of the hood where an opening 26 is provided to expose the serrated edges of the blades successively during rotation of member 7. The blades project slightly beyond the border edges 27 of the opening so as to obtain effective scaling results upon pressing the tool down and moving it lengthwise over a fish, and by substituting blades of different widths it is possible to obtain different scaling results. Thus, a wider blade than as shown would project the serrated edge thereof to a greater distance beyond said bearing edges and through said opening.

One end of the handle has a shallow recess to confine the inner nut 19 and the opposite tubular end incloses the coupling 9 for the extensible shaft, and protects the hand from engagement with the moving parts. In operation, the handle and hooded guard may be turned together about the bladed member, while the tool as a whole may be turned to different angular positions with perfect freedom of movement on the part of the operator.

What we claim is:

In a fish scaling device, a tubular handle having an annular enlargement at its end and a circular hood open at its bottom removably engaged on said enlargement and having a bearing in its outer end, a scaling tool rotatably mounted within said hood having a spindle engaged in said bearing and a terminal extension projected into said handle and a body within said hood provided with longitudinal slots lengthwise at intervals, serrated scaling blades removably secured in said slots and a shaft projected into said handle and operatively connected with said terminal extension, whereby the handle and hood are held stationary and the tool is rotated therein.

Signed at Cleveland, in the county of Cuyahoga, and State of Ohio, this 16 day of July, 1918.

FRED M. BOESCH.
EDGAR G. FOSTER.